A. BATAILLE.
Pipe Joint or Coupling.
No. 230,606. Patented Aug. 3, 1880.
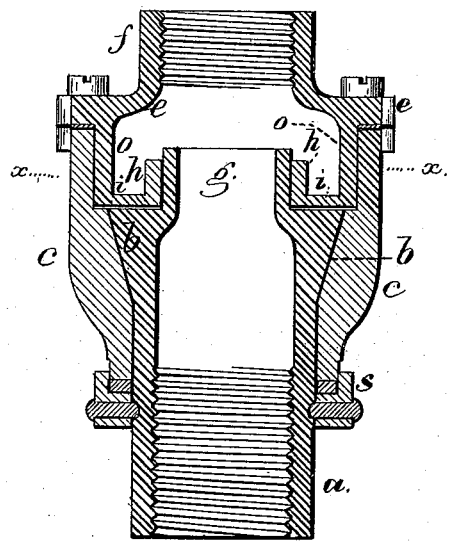
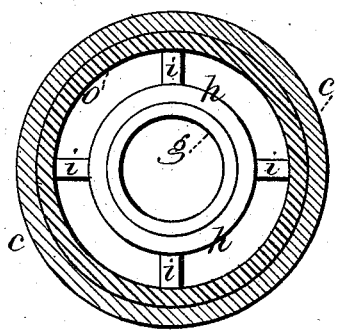
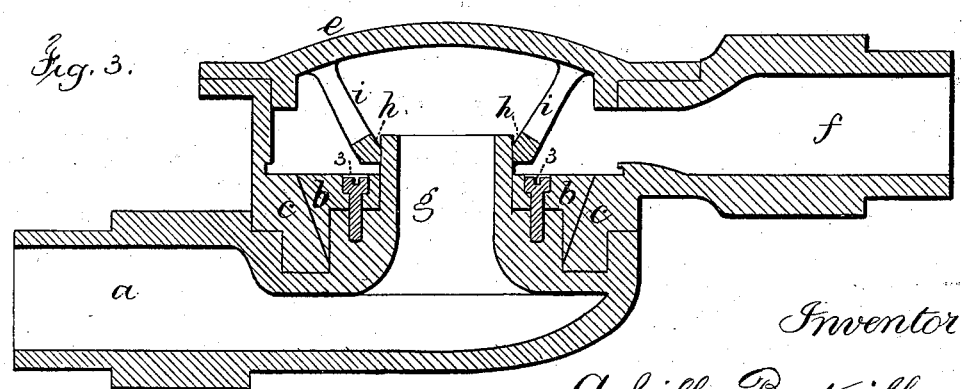
Witnesses
Chas. H. Smith
Geo. T. Pinckney
Inventor
Achille Bataille
per Lemuel W. Serrell
atty.

UNITED STATES PATENT OFFICE.

ACHILLE BATAILLE, OF NEW YORK, N. Y.

PIPE JOINT OR COUPLING.

SPECIFICATION forming part of Letters Patent No. 230,606, dated August 3, 1880.

Application filed December 26, 1879.

*To all whom it may concern:*

Be it known that I, ACHILLE BATAILLE, of the city and State of New York, have invented an Improvement in Pipe-Joints, of which the following is a specification.

In an application for a patent heretofore made by me a flexible joint for pipes is set forth. My present invention is an improvement upon and modification of the same.

I make use of an annular chamber around the inner portion of the coupling devices for the pressure to act between the two parts of the coupling and keep them in contact to form a tight joint, at the same time the parts can be turned the one on the other, so as to allow the necessary freedom of motion to adapt the joint to the tubes on railway-cars for the air-brakes or for other tubes, wherever available.

In the drawings, Figure 1 is a longitudinal section of the joint, and Fig. 2 is a cross-section at the line $x\ x$, and Fig. 3 is a section of a modification of this joint.

The tubular portion $a$ of the joint is to be connected with the hose or pipe, and around it is the conical bearing $b$ for the ring $c$, the interior of which ring is conical and adapted to fit the bearing $b$, and these conical surfaces should be ground together so as to be water or air tight. The cap $e$ is attached to the ring $c$, and it is provided with a tubular portion, $f$, to which the pipe or hose is connected.

There is a cylinder, $g$, within the coupling at the end of the conical portion $b$, and the cap $e$ is provided with a ring, $h$, that is connected by the arms $i$ with the cylindrical flange $o$ of this cap $e$, and said ring $h$ forms a guide around the cylinder $g$ to hold the respective parts of the coupling in their proper relation axially to each other, so that they may be turned freely the one on the other, but not become separated. The pressure of the liquid or fluid within the joint acts between the inside of the cap $e$ and the flat end of the cone $b$ to press the conical surfaces together endwise of the coupling, and the arms $i$ do not interfere with the pressure reaching and acting upon this flat end of the cone $b$; and I remark that if desired a washer of leather or similar material may be introduced between the ring $h$ and the end of the cone $b$, and between the cap $e$ and coupling $c$, where they are bolted together.

The parts are free to be turned or to accommodate themselves to their respective positions when there is not any pressure within the joint; but when the pressure is admitted the conical surfaces of $b$ and $c$ set together so closely as to form a tight joint, at the same time the parts can be turned one on the other, if required.

In Fig. 3 the parts correspond in construction and operation with those in Fig. 1, the only differences being that the pipes $a$ and $f$ turn off laterally, instead of being in line with the other portions of the joint. This renders it necessary to make the conical ring $b$ separate from the portion $a$, and introduce the same into the coupling-ring $c$ after it has been placed upon the other part of the joint, and secure this ring $b$ by screws 3 or other suitable fastenings.

If desired, the arms $i$, that secure the ring $h$ to the cap $e$, may stand at an inclination, as shown in Fig. 3, instead of flat, as in Fig. 1.

The guard-ring $s$ and washer may be applied around the pipe $a$ and secured thereto at the end of the joint $c$, so as to prevent the tube $a$ sliding into the joint $c$ accidentally and separating the conical surfaces.

I claim as my invention—

1. The combination, with the coupling-tubes $a\ f$, of the conical bearing $b$, ring $c$, cylinder $g$, cover $e$, arms $i$, and ring $h$, substantially as set forth, whereby the pressure acts within the annular portion $o$ of the joint to keep the parts $c$ and $b$ together, substantially as set forth.

2. The guard-ring $s$, in combination with the coupling-ring $c$, pipe $a$, cone $b$, and cap $e$, substantially as set forth.

Signed by me this 20th day of December, A. D. 1879.

ACHILLE BATAILLE.

Witnesses:
GEO. T. PINCKNEY,
WILLIAM G. MOTT.